Patented July 7, 1942

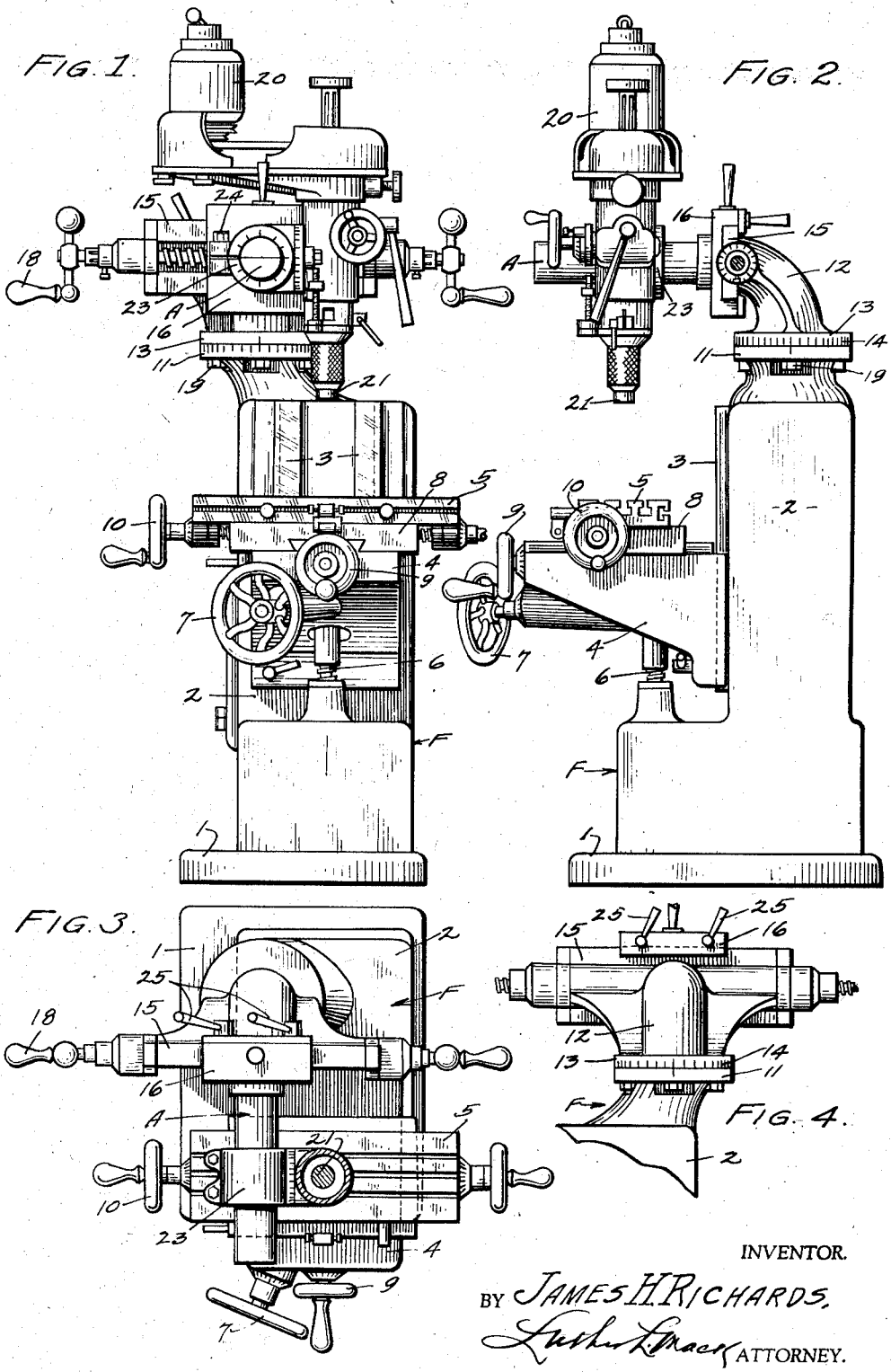

2,288,648

UNITED STATES PATENT OFFICE 2,288,648

ALL ANGLE MILLING MACHINE

James H. Richards, Glendale, Calif.

Application September 16, 1940, Serial No. 357,021

5 Claims. (Cl. 90—17)

This invention relates generally to milling machines, but more particularly to and has for an object the provision of an all-purpose, all-angle milling unit including the conventional work table or clamping bed which is vertically as well as horizontally adjustable in two directions, and a second clamping bed which is bodily adjustable to an extent of 360 degrees on a vertical axis and serves as a support for an overarm which is adjustable horizontally on said second bed and also with said bed rotarily, and a milling unit axially and rotatably adjustable at all angles on the overarm, whereby the tool spindle may be positioned at any desired angle, elevation or plane relative to the work held on the first mentioned bed or table.

A particular feature of my machine is the offset position of the vertical axis of the supplementary bed, the overarm and all angle milling unit, the axis of which is substantially spaced from the vertical axis of the column or frame of the machine so that a greater range of usefulness may be provided and the machine adapted for work which would not otherwise be possible.

Moreover, the overarm mounting permits of its adjustment, together with the milling unit, to an extent of 360 degrees, as well as in a horizontal plane to a substantial extent, while rigidly supporting the overarm in any position to which it is adjusted.

It is an object also, to provide a milling machine embodying a pair of beds adjustable on the frame of a machine, one of which is adapted to support the work and is adjustable vertically in the direction of the other bed, and is also adjustable on its support in relatively right angular planes, and the other bed spaced substantially from the nearest position to it of the work supporting bed, and adapted to adjustably support an overarm on which is carried a universally adjustable power driven milling unit so as to provide for the rotatable adjustment of the overarm and milling unit to an extent of 360 degrees on a vertical axis, and to a substantial extent in a horizontal plane as well.

Other and more detailed objects may appear in the description hereinafter and illustrated in the appended drawing, which shows a preferred form, subject to modification, within the scope of the appended claims without departing from the spirit of my invention.

In the consideration of my improvements, reference is made to my pending application for patent for Milling attachments, Serial No. 319,290, filed February 16, 1940, in which many of the details embodied in the present machine are shown and described.

In said drawing:

Fig. 1 is a front elevation of my assembled milling machine;

Fig. 2 is a side elevation thereof;

Fig. 3 is a top plan; and

Fig. 4 is a fragmentary rear elevation of the same.

The preferred embodiment of my invention includes a frame F which has a base 1 and a vertical column 2, the front side of which is provided with guides 3 on which a work bed support 4 is vertically adjustable for varying the elevation of a clamping bed 5 as by means of a jack-screw 6 operated by a hand wheel 7. Bed 5 is adjustable horizontally on the support 4 by means of the guide 8, controlled by a hand wheel 9, and is adjustable horizontally in a relatively right angular direction by means of a hand wheel 10, all of which is conventional practice. Usually, however, in milling machines, the overarm A is fixed to the top of column 2 and is disposed horizontally over the bed 5 for receiving and supporting a suitable milling attachment of variable characteristics, depending upon the character of the work to be done.

In my improvements, I provide means for rotatably adjusting the overarm A to an extent of 360 degrees about a vertical axis, and additionally for the adjustment of said overarm in a plane at right angles to the axis of rotatable adjustment.

In the present machine, said adjustment means includes a circular support 11 formed preferably, but not necessarily, at the top of column 2, and a bracket 12 having a circular flange 13 rotatably adjustable on the support 12, and preferably provided with micrometric graduations as at 14 for selectively positioning and indicating the selective adjustment of the bracket 12 on the support 11.

Bracket 12 has a guide 15 on which a supplemental bed 16 is horizontally adjustable, and preferably, guide 15 and bed 16 are disposed edgewise and are off-set from the operating plane of the work bed 5, and substantially spaced above the uppermost position of bed 5. Also the axis of bracket 12, which supports the bed 16, is substantially off-set from the vertical axis of column 2 for purposes hereinafter explained.

Supplemental bed 16 forms an adjustable support for overrun A so that said overarm may be adjustable to and clamped in any desired position longitudinally of the bed 16 as by conventional means or otherwise. The position of bed 16 on guide 15 is varied as by means of a hand wheel 18, and the angular adjustment of bracket 12 and overarm A about the axis of support 11 may be established and maintained by any suitable means, as for instance, one or more set screws or bolts 19.

Overarm A is arranged for operatively supporting a suitable milling tool for various operations of the machine, and is particularly adapted to support a unitary power driven attachment, as shown in my said application for patent Serial No. 319,290, filed February 16, 1940, which includes a motor 20 operatively connected with a tool spindle 21 and adapted to be axially and rotatably adjustable as a unit for providing an all angle adjustment of the tool, relative to overarm A, and supported on said overarm as by means of a fixture 23 including clamping bolts 24.

The adjustable mounting of the overarm A, as shown, is such that said overarm may be moved into and supported in any desired position, radially of its axis in a plane substantially spaced from the work bed 5 so that the tool spindle will be disposed at a given angle or at a compound angle by reason of the several adjustments of the milling unit, described in my said pending application, and further description of which is deemed not to be necessary in this instance. The overarm which supports the milling unit, may be moved completely to the rear or to a side of the column 2, out of engagement with the work or interference with the bed 5 for the purpose of positioning work on said bed 5 when and as desired and necessary. The offset relation of the axis of rotation of bracket 12 with respect to the central axis of the column 2 permits the overarm to be adjusted so the milling unit and tool may be positioned over the central portion of the bed and aligned with the axis of the column.

The bed 16 can be clamped and held at selected positions on a guide 15 as by means of clamping devices 25, and the work is supported by suitable clamping devices engaging with the inverted T-slots of the bed 5. In other respects, the means employed for adjustably supporting the different elements of the mechanism are substantially conventional.

It will, thus, be observed that I have provided a completely, universally adjustable milling machine capable of performing practically all milling operations incidental to machine tool practice, and particularly the rotatable adjustment of the overarm A, combined with the longitudinal adjustment of said overarm, provides a distinct improvement in the art over the usually fixed overarm or the vertical adjustment thereof, as has been done in other machines.

Thus, it will be noted that I have provided a new and novel arrangement of elements in a milling machine, comprising a work supporting bed which is vertically adjustable, relative to the supplemental overarm and milling attachment carrying bed, and is additionally and conventionally adjustable horizontally at right angles on its support while the overarm and milling attachment supporting bed is rotatably adjustable on its vertical axis to an extent of 360 degrees, and is additionally adjustable longitudinally of said bed to a substantial extent, for selectively positioning the tool in operative engagement with the work at any selected angle, single or compound, as the case may be, and moreover, the milling attachment unit is of itself, universally adjustable in its position on said overarm.

I claim:

1. In a milling machine of the character described having a column extending upwardly from a base and a work bed horizontally and vertically adjustable on said column, a horizontally disposed overarm supported on said column for rotation about a vertical axis offset with respect to the axis of said column, a milling unit including a power element carried by said overarm and adjustable longitudinally and rotatively thereof, and means rotatable with said overarm for effecting transverse adjustment thereof, whereby said milling unit may be positioned at any point in a plane parallel to said bed and disposed at any angle thereto.

2. In a milling machine of the character described having a column extending upwardly from a base and a work bed horizontally and vertically adjustable on said column, a horizontally disposed overarm supported on top of said column for rotation about a vertical axis throughout a range of 360 degrees, said vertical axis being offset with respect to the central axis of said column, a milling unit including a power element carried by said overarm and adjustable longitudinally and rotatively thereof, and means rotatable with said overarm for effecting transverse adjustment of said overarm, whereby said milling unit may be positioned at any point in a plane parallel to said bed and disposed at any angle thereto.

3. In a milling machine of the character described having a column extending upwardly from a base and a work bed horizontally and vertically adjustable on said column, a bracket supported by said column for rotation about a vertical axis and having a guideway forming a support for a horizontally disposed overarm, said overarm being arranged substantially normal to and adjustable along said guideway, and a milling unit including a power element carried by said overarm and adjustable longitudinally and rotatively thereof, whereby said milling unit may be positioned at any point in a plane parallel to said bed and disposed at any angle thereto.

4. In a milling machine of the character described having a column extending upwardly from a base and a work bed horizontally and vertically adjustable on said column, a bracket supported by said column for rotation about a vertical axis, a guideway on said bracket for supporting a horizontally disposed overarm substantially normal thereto, means for moving said overarm along said guideway, and a milling unit including a power element carried by said overarm and adjustable longitudinally and rotatively thereof, whereby said milling unit may be positioned at any point in a plane parallel to said work bed and disposed at any angle thereto.

5. In a milling machine of the character described having a column extending upwardly from a base and a work bed horizontally and vertically adjustable on said column, a bracket on said column rotatable about a vertical axis offset with respect to the central axis of said column, a horizontally disposed guideway on said bracket and rotatable therewith, a horizontally disposed overarm supported on said guideway substantially normal thereto, means for moving said overarm along said guideway, and a milling unit including a power element carried by said overarm and adjustable longitudinally and rotatively thereof, whereby said milling unit may be positioned at any point in a plane parallel to said work bed and disposed at any angle thereto.

JAMES H. RICHARDS.